(12) United States Patent
Watson et al.

(10) Patent No.: US 7,976,042 B2
(45) Date of Patent: Jul. 12, 2011

(54) RETRACTABLE STEP

(76) Inventors: Bradley E. Watson, Barrie (CA);
Charles J. Chuba, Howell, MI (US);
Ben Yang, Maple (CA); John Harding,
Gormley (CA); Christopher J. Kuntze,
Clarkston, MI (US); Trevor Thompson,
Puslinch (CA)

( * ) Notice: Subject to any disclaimer, the term of this patent is extended or adjusted under 35 U.S.C. 154(b) by 966 days.

(21) Appl. No.: 11/841,280

(22) Filed: Aug. 20, 2007

(65) Prior Publication Data
US 2008/0042396 A1 Feb. 21, 2008

Related U.S. Application Data

(60) Provisional application No. 60/838,800, filed on Aug. 18, 2006.

(51) Int. Cl.
*B60R 3/02* (2006.01)
(52) U.S. Cl. ...................................... 280/166

(58) Field of Classification Search .................. 280/163, 280/164.1, 166, 169; 182/127
See application file for complete search history.

(56) References Cited

U.S. PATENT DOCUMENTS

| 2,158,949 A * | 5/1939 | Sarles et al. | 182/91 |
| 3,517,942 A * | 6/1970 | Cuffe et al. | 280/166 |
| 4,205,862 A * | 6/1980 | Tarvin | 280/166 |
| 5,927,433 A * | 7/1999 | Jaramillo, Sr. | 182/91 |
| 6,641,158 B2 | 11/2003 | Leitner | |
| 6,830,257 B2 | 12/2004 | Leitner | |
| 7,055,839 B2 | 6/2006 | Leitner | |
| 2002/0113400 A1 * | 8/2002 | Leitner | 280/166 |
| 2003/0038446 A1 * | 2/2003 | Anderson et al. | 280/166 |
| 2004/0084868 A1 * | 5/2004 | Leitner et al. | 280/166 |

* cited by examiner

*Primary Examiner* — Frank B Vanaman
(74) *Attorney, Agent, or Firm* — Miller Canfield

(57) ABSTRACT

A step assembly includes an upper housing adapted to be fixedly secured to the motor vehicle. A step is movable relative to the upper housing between a stowed position and a deployed position. A single arm is pivotal with respect to the upper housing and pivotal with respect to the step in order to form a three-bar linkage for moving the step between the stowed and deployed positions.

20 Claims, 16 Drawing Sheets

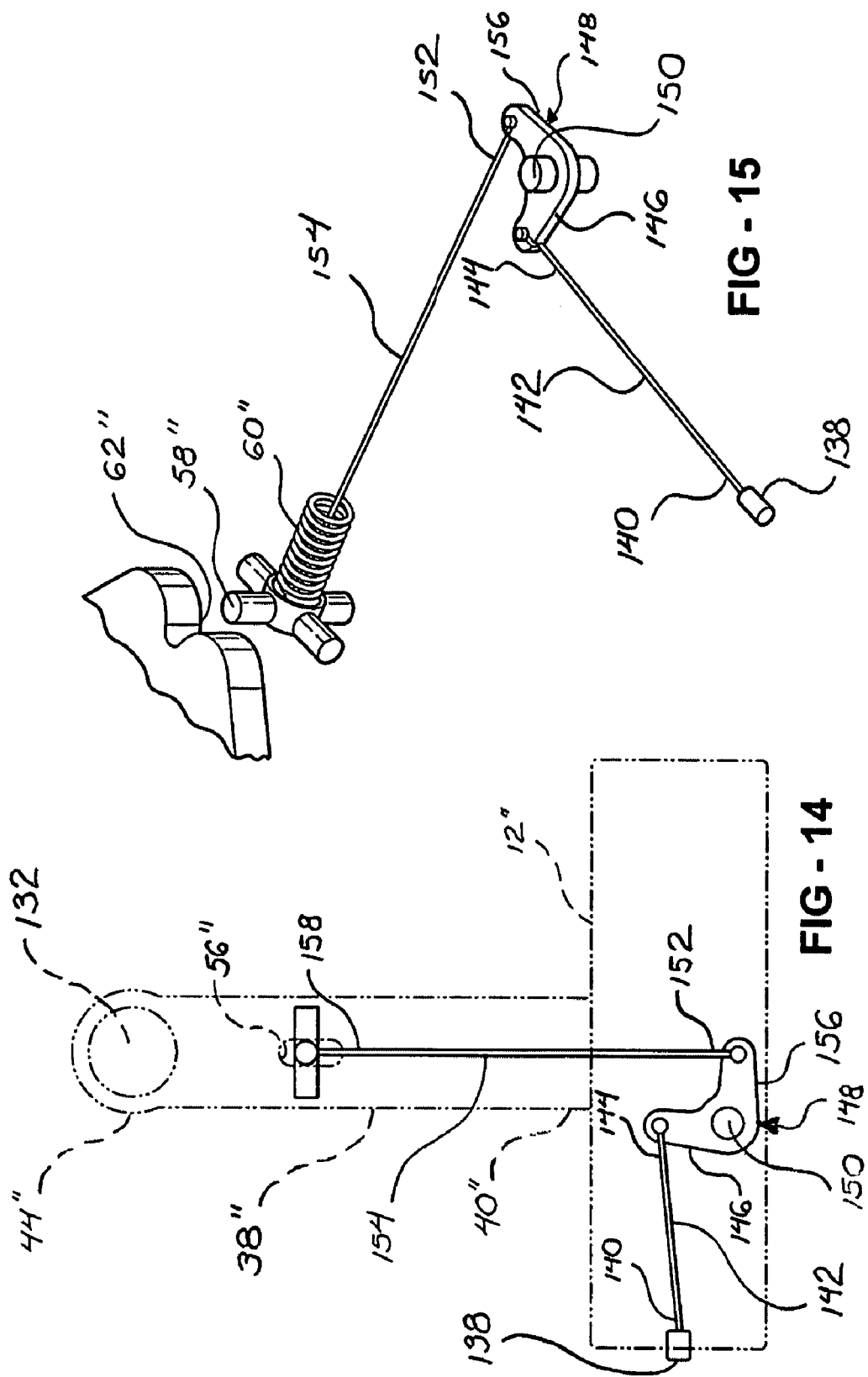

RETRACTABLE STEP

CROSS-REFERENCE TO RELATED APPLICATION

This application claims the benefit of and priority to U.S. Provisional Application Ser. No. 60/838,800, filed Aug. 18, 2006.

BACKGROUND

The invention relates to a step assembly for a motor vehicle. More particularly, the invention relates to a step assembly including a three bar link for moving a step between a stowed position and a retracted position.

It is well-known in the art to provide fixed running boards or fixed step assemblies along one side of a motor vehicle to assist individuals in either entering and exiting or accessing a motor vehicle having a high ground clearance. These fixed running boards have, however, certain disadvantages. For example, such fixed running boards are often placed at a height that is not practical for a large number of users. In addition, these fixed running boards are susceptible to dirt and mud accumulation, which can then be easily transferred to a user's clothing. Moreover, these fixed running boards reduce the ground clearance for the motor vehicle and, as such, can be damaged during off-road motor vehicle operation.

Retractable running boards or step assemblies are generally movable between a retracted position, in which a step is tucked underneath an underbody of the motor vehicle, and an extended position, in which the step is spaced apart from the underbody of the motor vehicle to support the user. Retractable running boards commonly incorporate a four-bar link, that is, four distinct members for securing the step to the motor vehicle. The four-bar links occupy, however, a relatively large amount of space along the underbody and such space along the underbody is at a premium.

SUMMARY

A step assembly includes an upper housing adapted to be fixedly secured to a motor vehicle. A step is movable relative to the upper housing between a stowed position and a deployed position. A single arm is pivotal with respect to the upper housing and pivotal with respect to the step in order to form a three-bar linkage for moving the step between the stowed and deployed positions.

According to another aspect of the invention, a step assembly for a motor vehicle includes a pair of spaced apart upper housings adapted to be fixedly secured to the motor vehicle. A drive shaft extends between and is rotatable relative to the pair of spaced apart upper housings. A platform is movable relative to each upper housing between a stowed position and a deployed position. An arm extends between each of the spaced apart upper housings and the platform. Each of the arms includes a first end fixedly secured to the drive shaft and a second end pivotal with respect to the platform for moving the platform between the stowed and deployed positions.

According to yet another aspect of the invention, a step assembly for a motor vehicle includes an upper housing adapted to be attached to the motor vehicle. A rotatable shaft is at least partially disposed within the upper housing. An arm has a first end fixedly secured to the rotatable shaft and a second end. A step is fixedly secured to the second end of the arm and movable in response to rotation of the rotatable shaft for movement between a stowed position generally underneath the motor vehicle and a deployed position spaced apart from the motor vehicle in an outboard direction relative thereto.

According to still another aspect of the invention, a step assembly for a motor vehicle includes an upper housing fixedly secured to the motor vehicle. The upper housing includes a guide slot. A step is movable relative to the upper housing between a stowed position and a deployed position. An arm is pivotal with respect to the upper housing and pivotal with respect to the step for moving the step between the stowed and deployed positions. An extension member is fixedly secured to the arm. The extension member includes a guide pin received within the guide slot and movable therewithin as the step moves between the stowed and deployed positions.

BRIEF DESCRIPTION OF THE DRAWINGS

The invention will be readily appreciated as the same becomes better understood by reference to the following detailed description when considered in connection with the accompanying drawings wherein:

FIG. 14 is a top view of the shaft, arm, and step of the step assembly;

FIG. 15 is a perspective view including a release button operably coupled to a deploy lock pin;

DETAILED DESCRIPTION OF THE EMBODIMENTS

Figure 1:
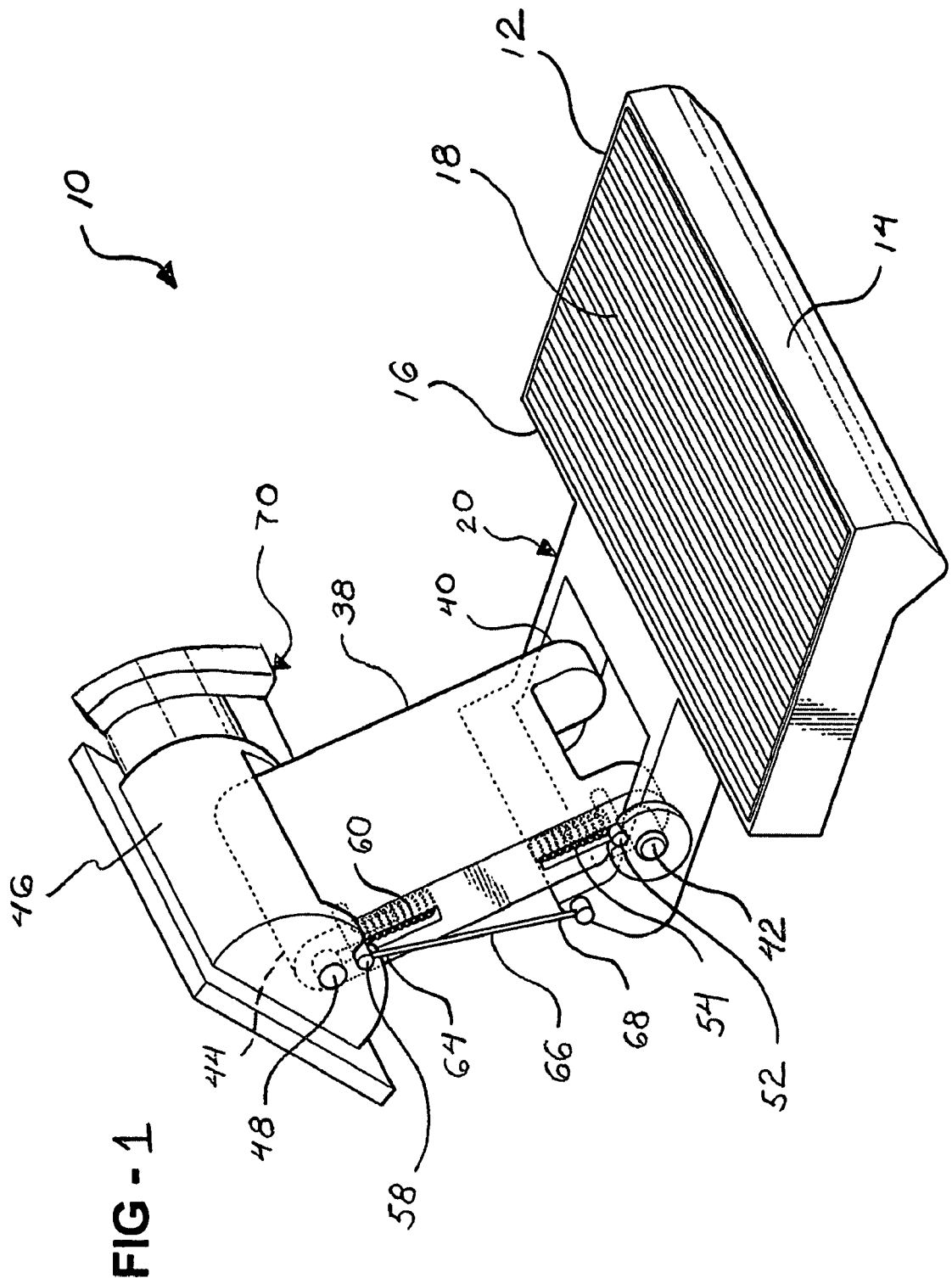
FIG. 1 is a perspective view of a step assembly according to one embodiment of the invention.

Referring to FIG. 1, a step assembly according to one embodiment of the invention is generally shown at 10. The step assembly 10 includes a step 12 for supporting individuals entering or exiting a motor vehicle. The step 12 includes an outboard end 14, an opposing inboard end 16, and a stepping surface 18 extending between the outboard 14 and inboard 16 ends.

Figure 2:
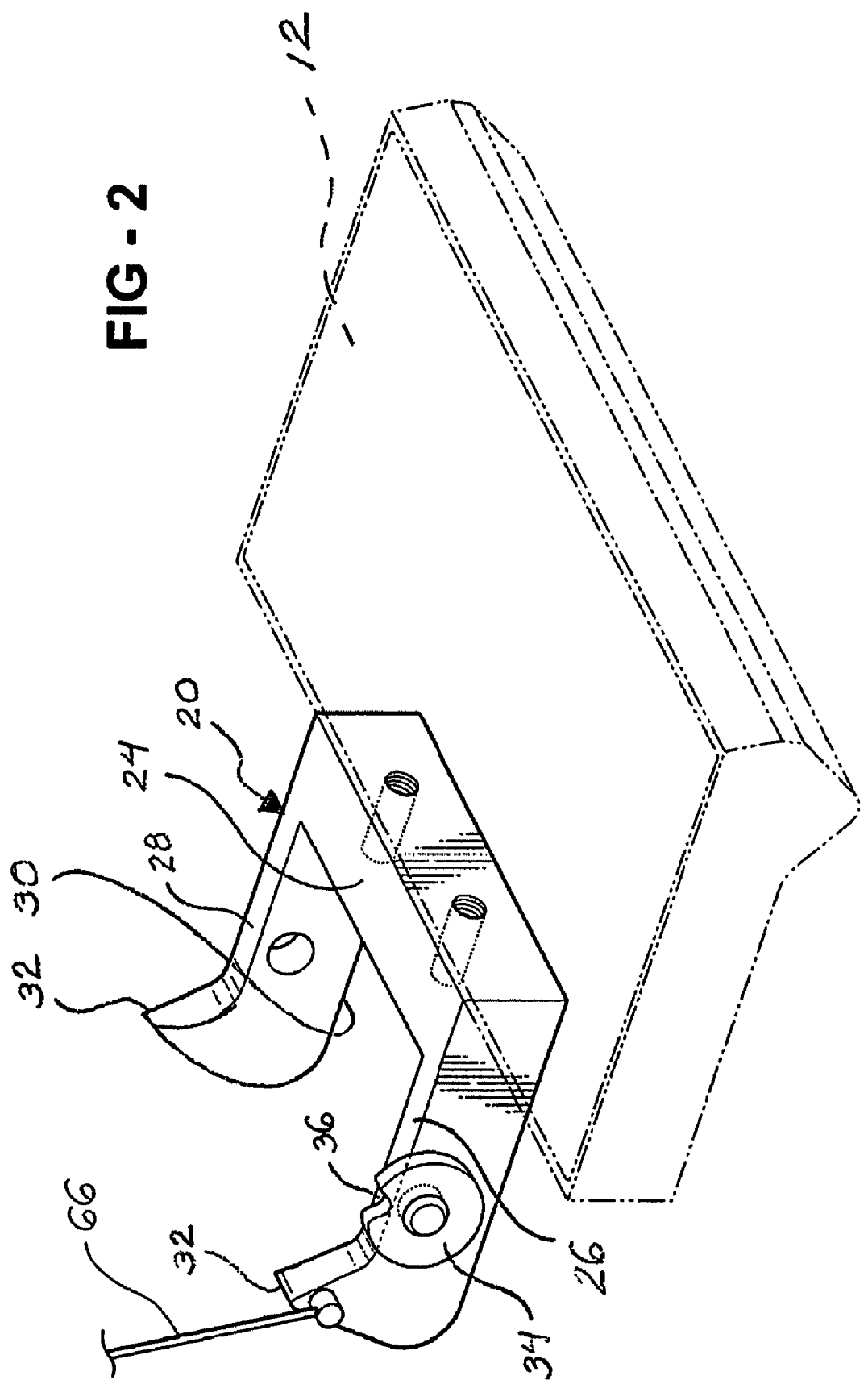
FIG. 2 is a perspective view of a link of the step assembly.
Figure 3:
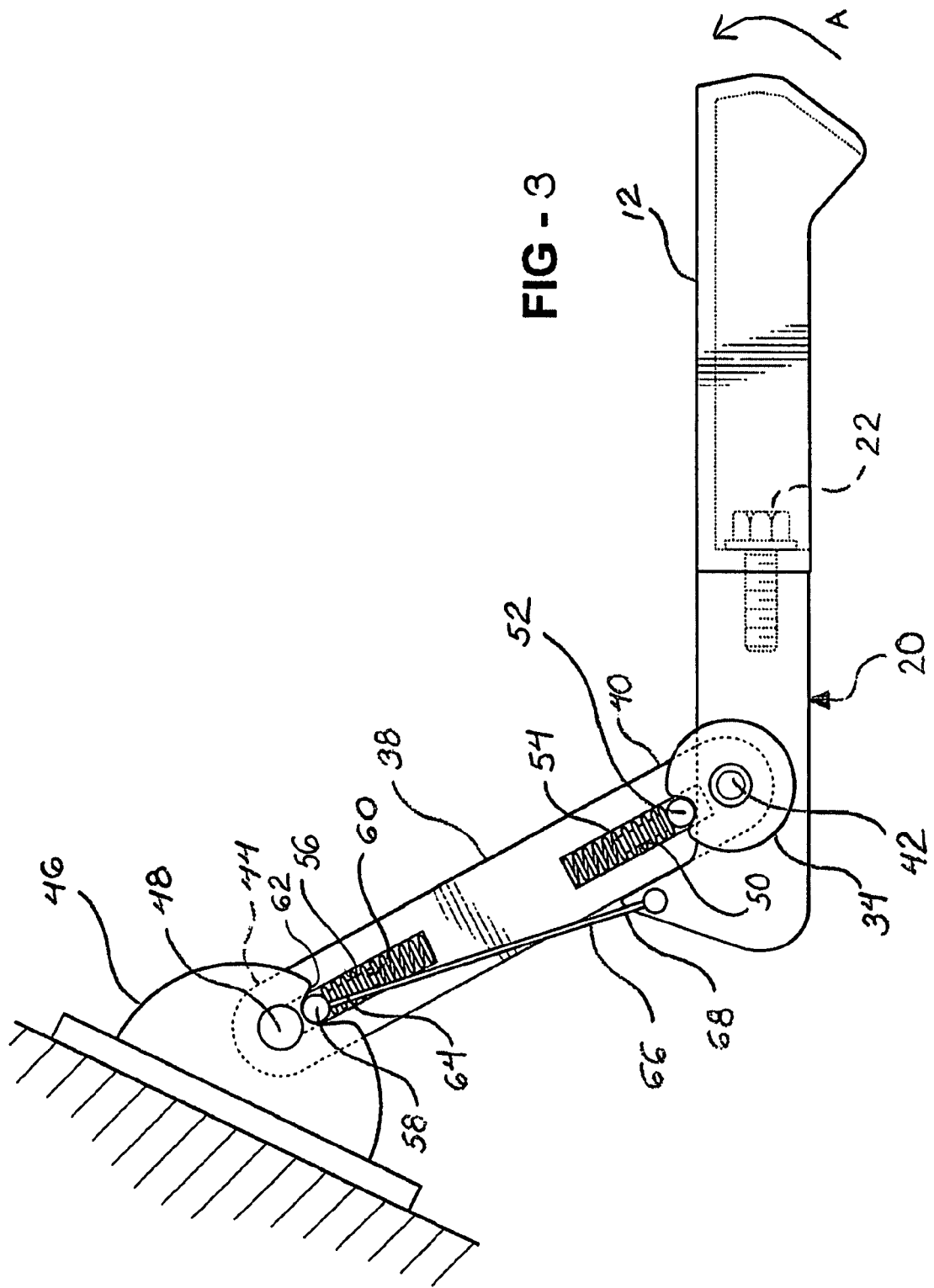
FIG. 3 is a side view of the step assembly including a single arm extending between the link and an upper housing.

Referring to FIGS. 1 through 3, a link, generally indicated at 20, is fixedly secured to the step 12 by at least one fastener 22. As shown in FIG. 2, the link 20 includes a main body portion 24 and a pair of spaced apart leg members 26, 28 extending out therefrom. The pair of spaced apart leg members 26, 28 defines an opening 30 therebetween. Each of the pair of spaced apart leg members 26, 28 terminates at a locking end 32. A cam member 34 is coupled to at least one of the pair of spaced apart leg members 26, 28. The cam member 34 defines a slot 36.

Figure 4:
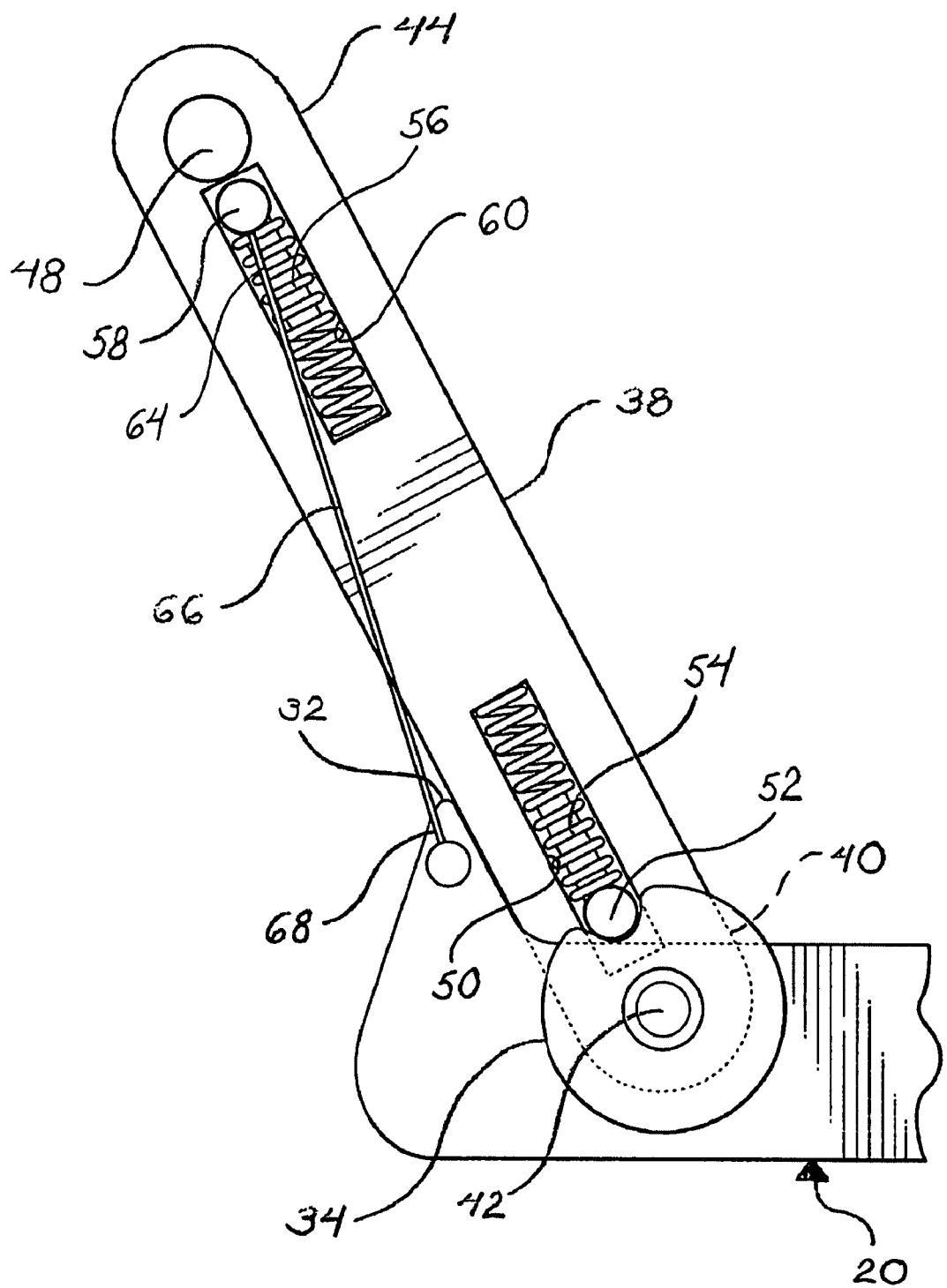
FIG. 4 is an enlarged side view of the step assembly.

Referring to FIGS. 3 and 4, an arm 38 includes a first end 40 pivotally secured to the link 20 about pivot pin 42 and an opposing second end 44 pivotally secured to an upper housing 46 about a pivot pin 48. The arm 38 provides for pivotal movement of the step 12 between a stowed position, in which a substantial portion of the step 12 is tucked below a body panel of a motor vehicle, and a deployed position (as shown in FIG. 1), in which the step 12 is spaced further apart from the body panel and available to receive individuals entering or exiting the motor vehicle.

A lower slot 50 is formed at the first end 40 of the arm 38. A tilt lock pin 52 is disposed within the lower slot 50. The tilt lock pin 52 is selectively received within the slot 36 of the cam member 34. A tilt lock spring 54 is connected to the tilt lock pin 52.

An upper slot 56 is formed at the second end 44 of the arm 38. A deploy lock pin 58 is received within the upper slot 56. A deploy spring 60 is connected to the deploy lock pin 58. The deploy lock pin 58 is selectively positioned within a notch 62 in the upper housing 46. One end 64 of a release cable or rod 66 is coupled to the deploy lock pin 58 and an opposing end 68 of the release cable 66 is coupled to the link 20.

Figure 5:
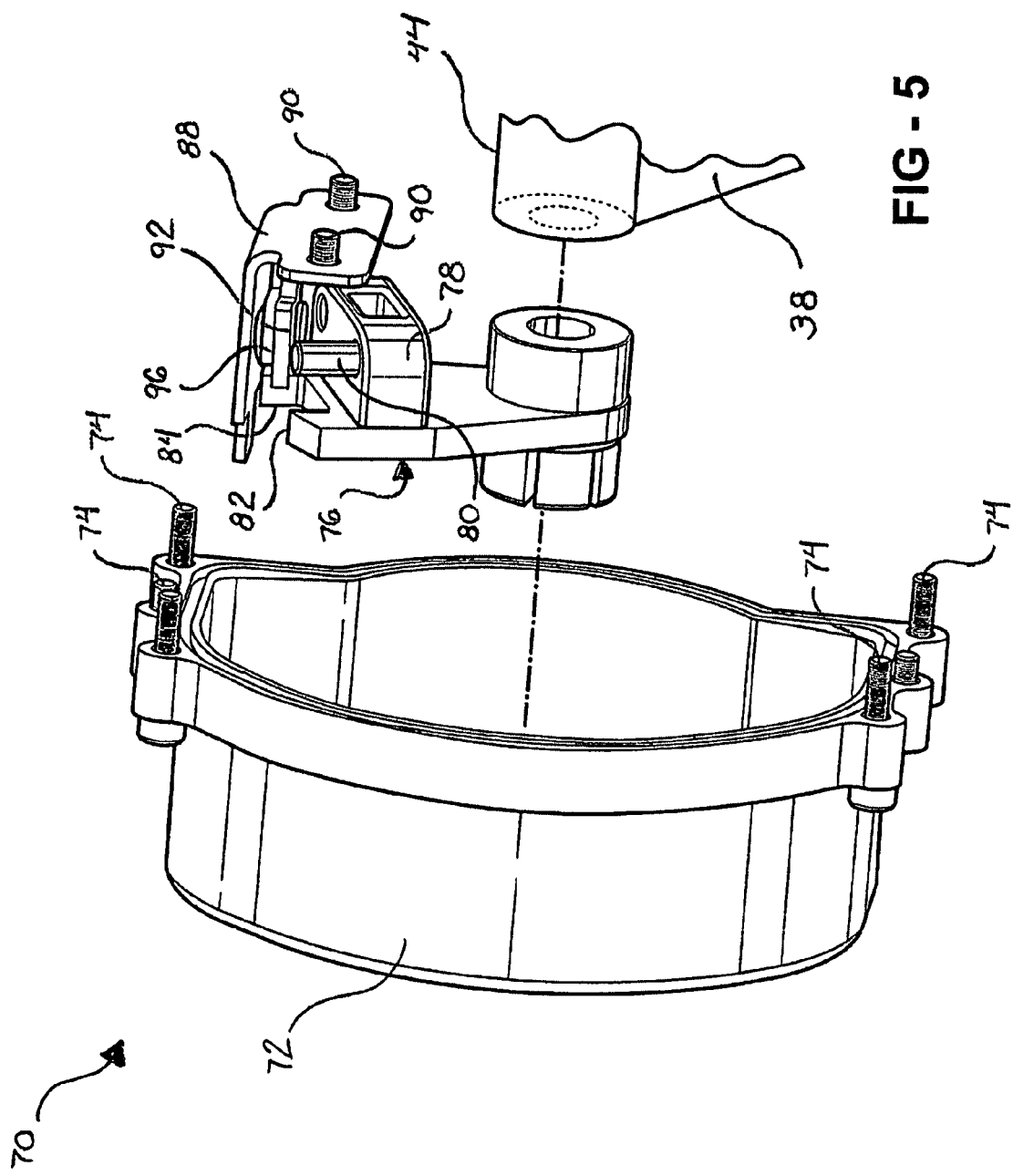
FIG. 5 is an exploded, perspective view of a latch assembly for the step assembly including a cover, a latch hub, a pawl mount, and a pawl.
Figure 6:
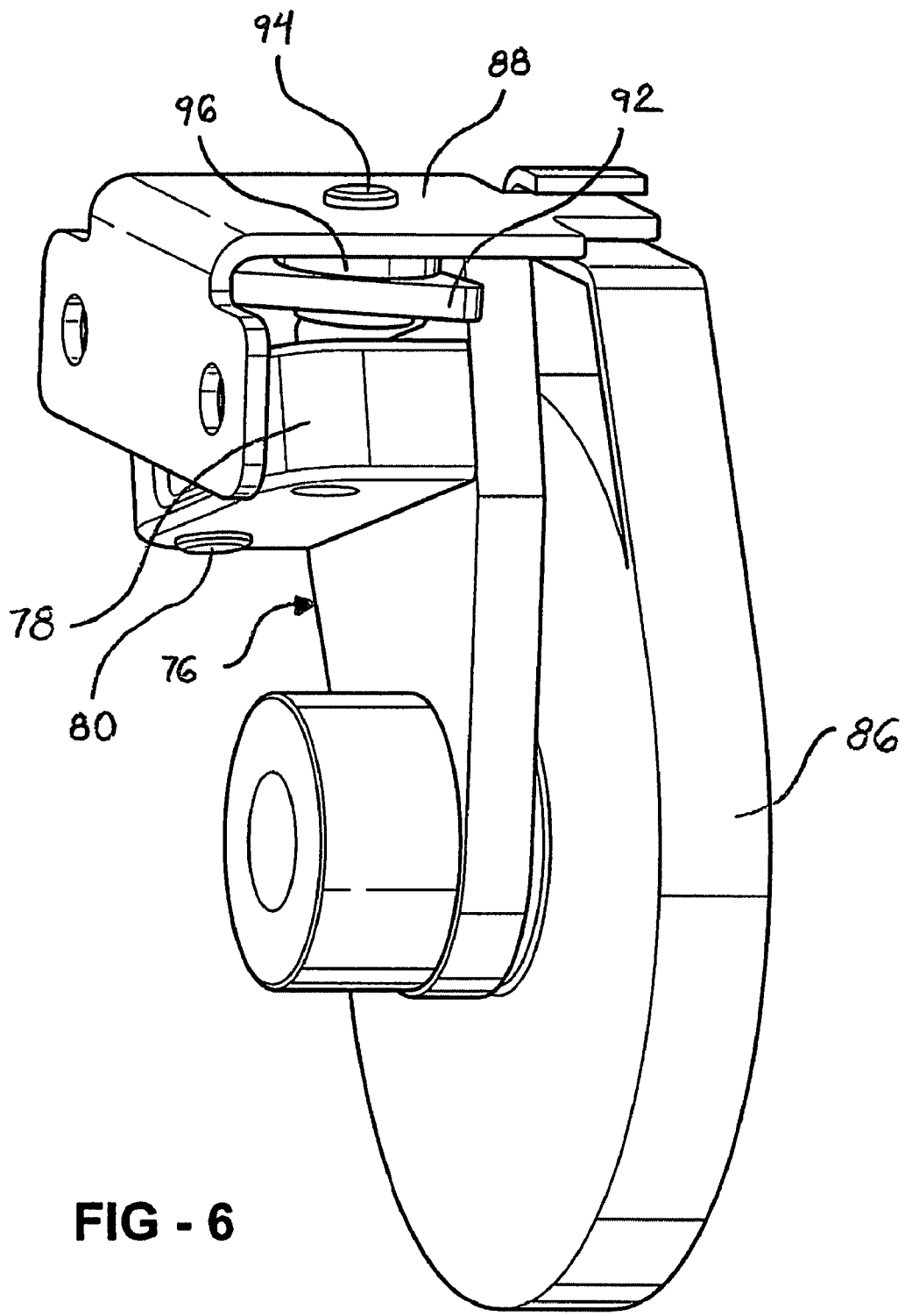
FIG. 6 is a perspective view of the latch hub coupled to the pawl mount.
Figure 7:
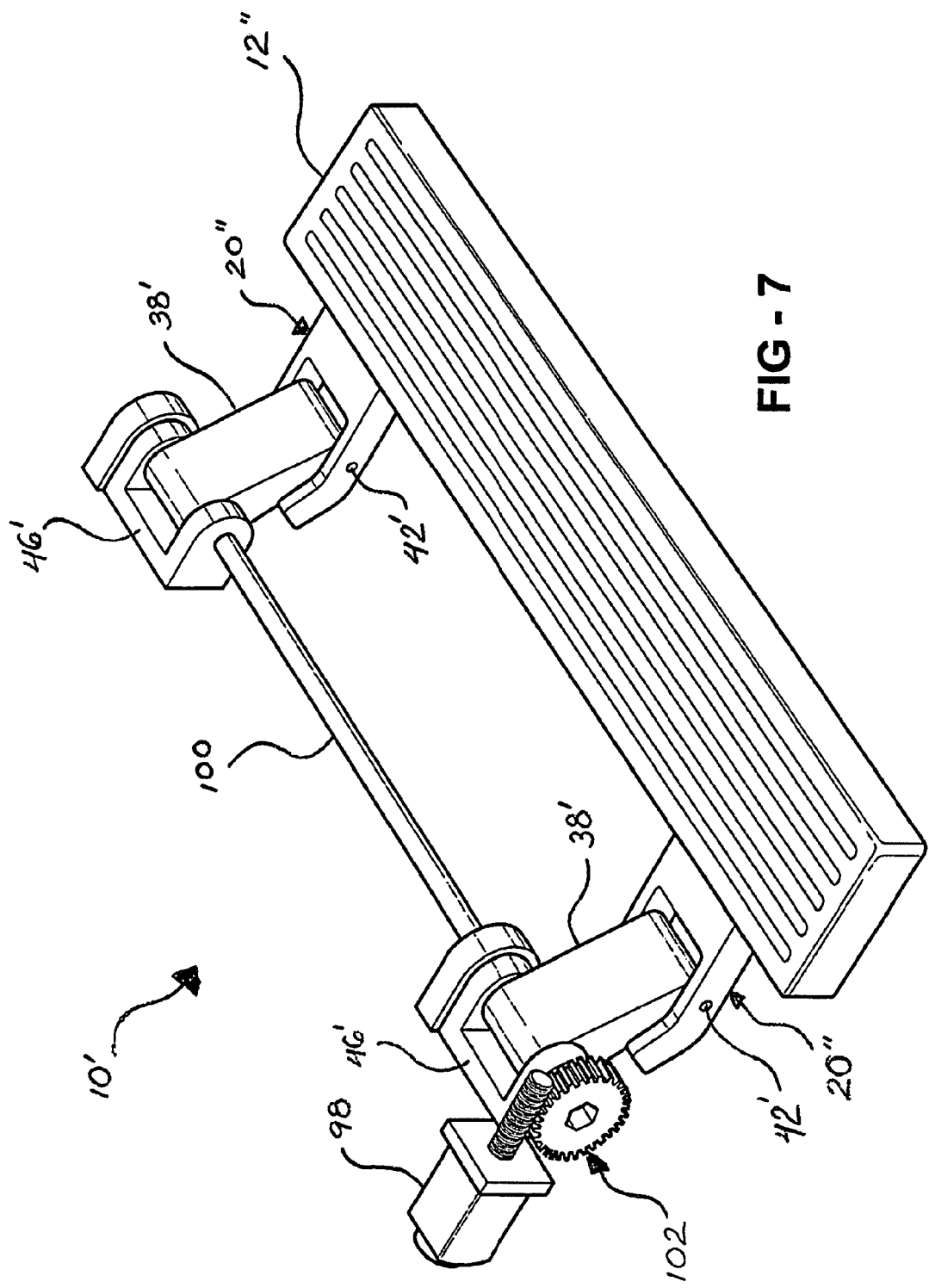
FIG. 7 is a perspective view of a step assembly according to a second embodiment of the invention.
Figure 8:
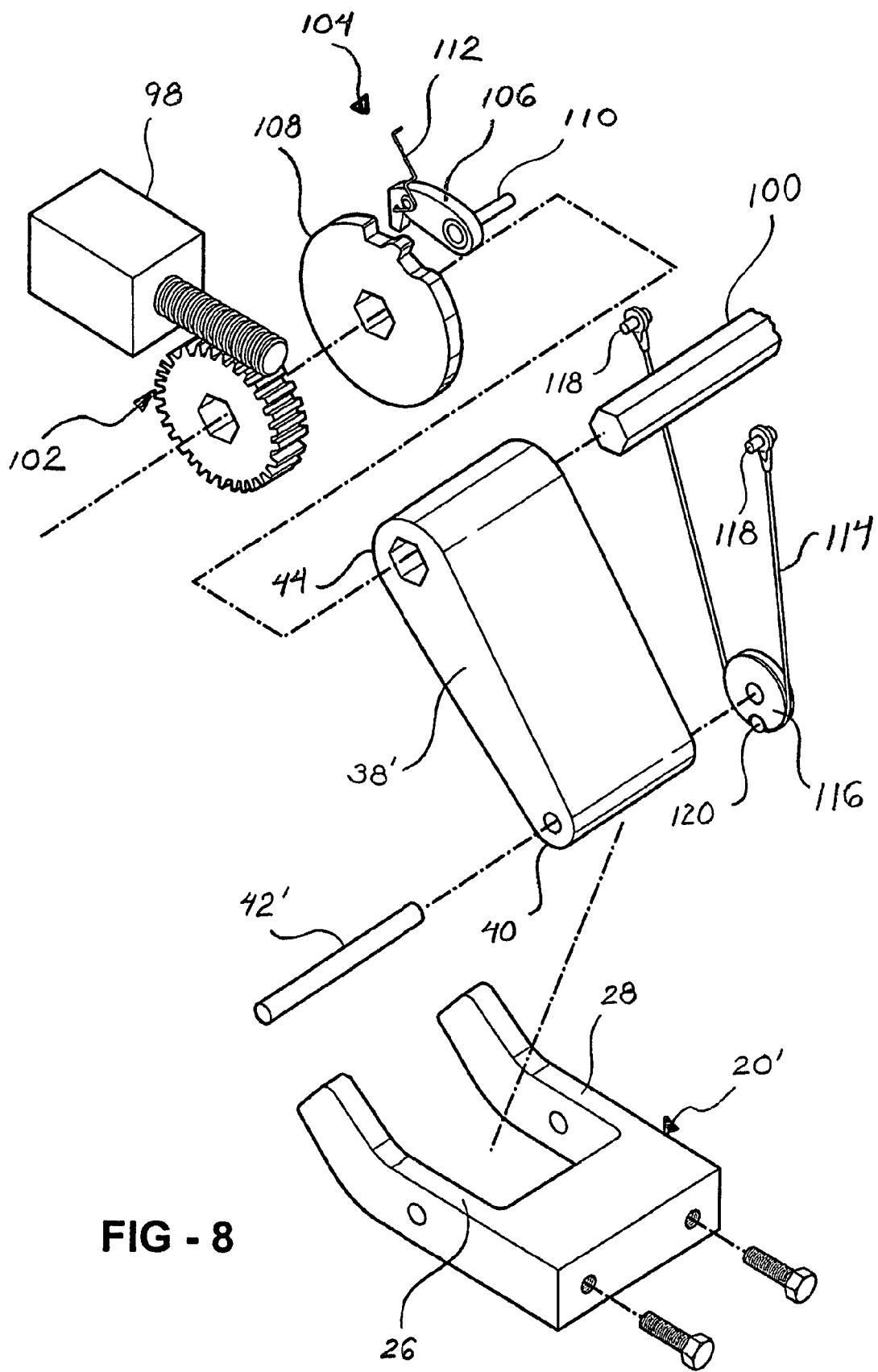
FIG. 8 is an exploded, fragmentary, perspective view of one end of the step assembly.
Figure 9:
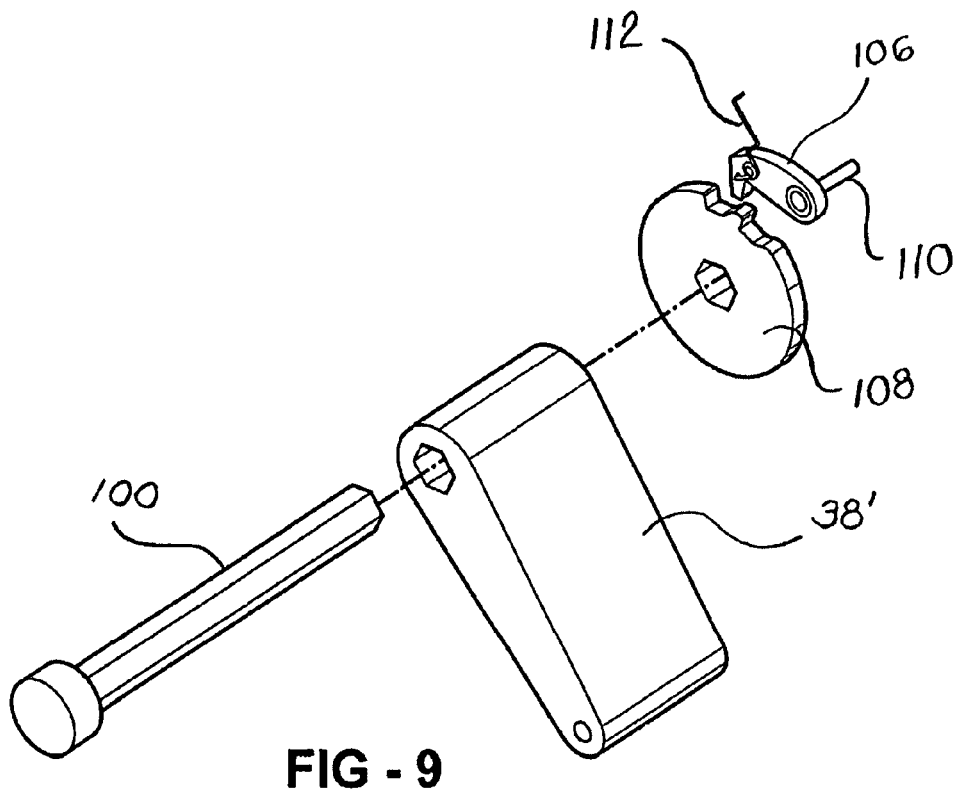
FIG. 9 is a exploded, perspective view of an arm, drive shaft, and ratchet mechanism of the step assembly.
Figure 10:
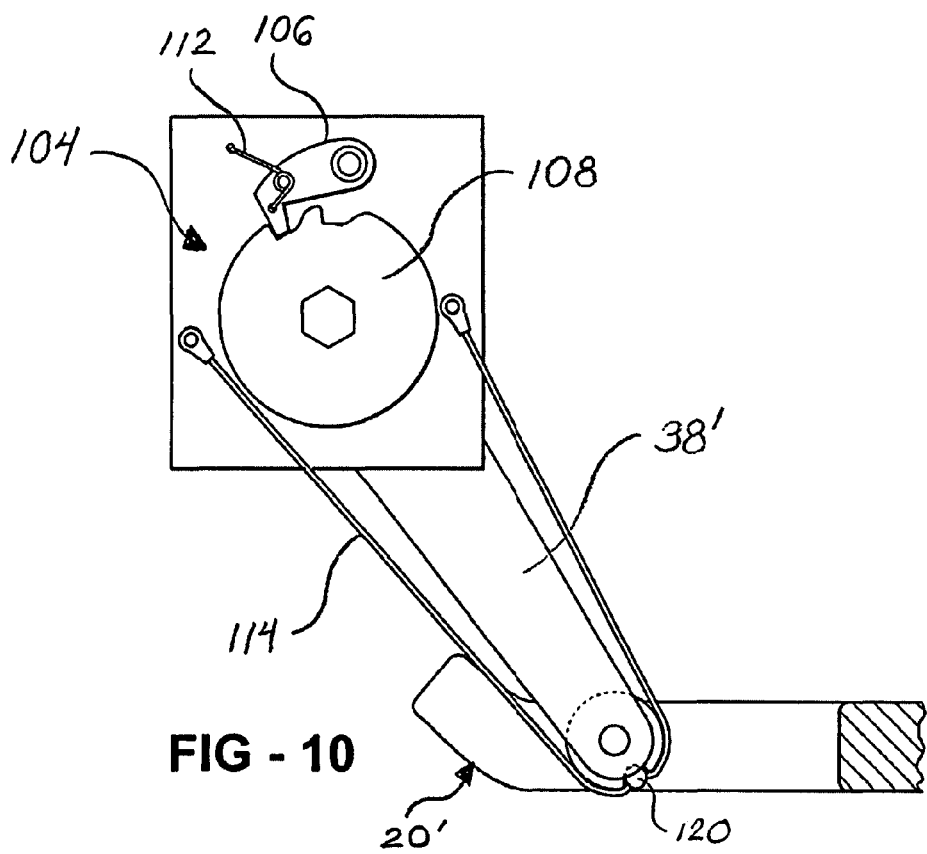
FIG. 10 is a side view of the ratchet mechanism and the arm.

The upper housing 46 is fixedly secured to the body panel of the motor vehicle to position the step assembly 10 therealong. A latch assembly, generally indicated at 70 in FIG. 1, is coupled to the upper housing 46 for retaining the step 12 in the stowed position. Referring to FIGS. 5 and 6, the latch assembly 70 includes a latch cover 72 fixedly secured to the upper housing 46 via a plurality of fasteners 74. A latch hub, generally indicated at 76, is operatively coupled to the arm 38 at the second end 44 thereof. More specifically, the latch hub 76 and the arm 38 are each fixedly mounted to the pivot pin 48. Therefore, pivotal movement of the arm 38 results in pivotal movement of the latch hub 76. The latch hub 76 includes a main body 78 and a latch pin 80 extending out therefrom. In addition, a pair of spaced apart fork members 82, 84 extends out from the main body 78. A deploy spring 86 is secured to the latch hub 76.

A mounting plate 88 is fixedly secured to the upper housing 46 by fasteners 90. A pawl 92 rotates relative to the mounting plate 88 about a pawl rivet 94. A washer 96 spaces the pawl 92 away from the mounting plate 88.

In operation, a user desiring to move the step 12 out of the stowed position and into the deployed position provides an initial foot action to the step 12 to pivot the arm 38. The pivotal movement of the arm 38 pivots the latch hub 76 and disengages the fork members 82, 84 thereof from the pawl 92. The deploy spring 86 biases the step 12 towards the deployed position. The arm 38 will continue to rotate until the distal locking ends 32 of the link 20 engage the arm 38, which provides a mechanical stop for the step 12. At the same time, the deploy lock pin 58 is received within the notch 62 in the upper housing 46. The step 12 is thus retained in the deployed position to assist individuals entering and exiting the motor vehicle.

To move the step 12 from the deployed position back to the stowed position, an individual provides an initial foot action to the step 12 in an upward direction A, shown in FIG. 3. This initial foot action pulls the distal locking ends 32 of the link 20 downwards. As a result, the release cable 66 pulls the deploy lock pin 58 out of the notch 62 in the upper housing 46. Additional foot action causes pivotal movement of the arm 38. At the same time, the latch hub 76 pivots until the latch pin 80 and spaced apart fork members 82, 84 are engaged by the pawl 92 so that the latch assembly 70 retains the step 12 in the stowed position. In the stowed position, the tilt lock pin 52 is received within the slot 36 in the cam member 34 in order to prevent the step 12 from tilting out of the stowed position.

Referring to FIGS. 7 through 11, wherein like primed reference numerals represent similar elements as those set forth above, the step assembly 10' according to a second embodiment of the invention includes a motor 98 operably connected to a drive shaft 100 via a plurality of gears 102. The drive shaft 100 fixedly supports two arms 38'. Rotation of the drive shaft 100 causes each arm 38' to pivot about the pivot pins 42, 48 to move the step 12' between the stowed and deployed positions. It is appreciated that in the present embodiment, the step 12' may be a platform step or running board.

The step assembly 10' includes a ratchet mechanism, generally shown at 104, having a pawl 106 interengaging a cam 108 for locking and unlocking the step 12'. A pawl pin 110 extends out from the pawl 106. A pawl toggle spring 112 biases the pawl 106. The cam 108 is mounted on the drive shaft 100. Thus, the drive shaft 100, cam 108, and arms 38' rotate as a unit.

The step assembly 10' also includes a cable 114 and sector 116 for controlling rotation of the step 12' relative to the arms 38'. A pin 118 is fixedly secured to each end of the cable 114. A ball stud 120 is selectively retained by the sector 116.

Figure 11A:
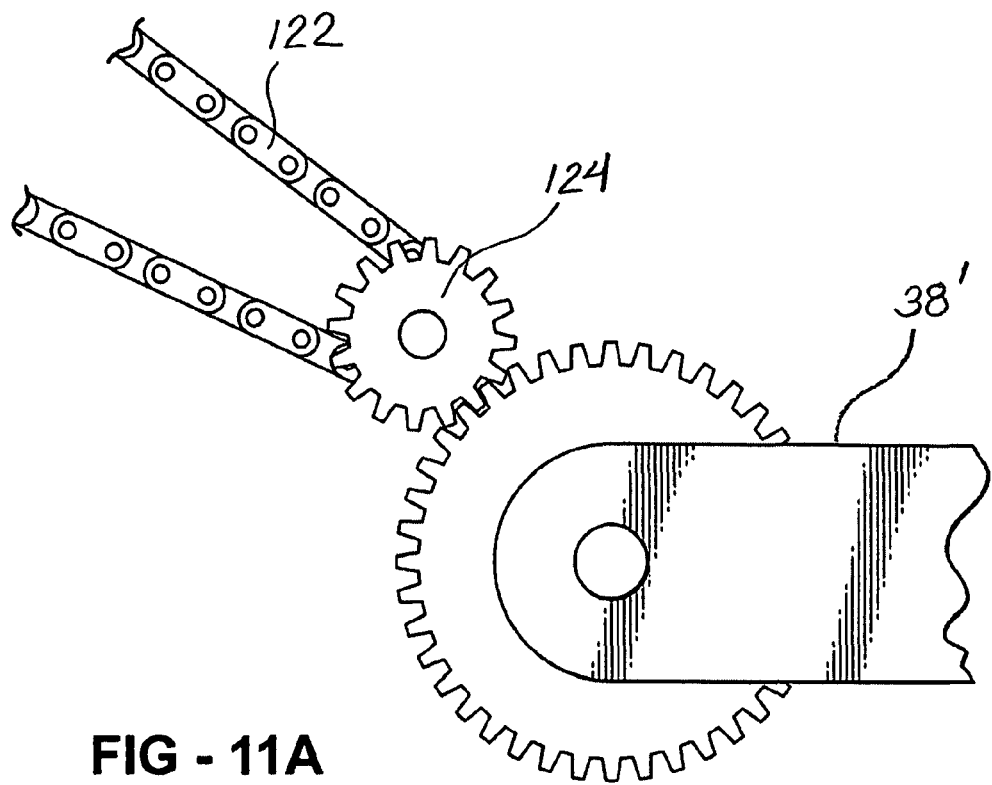
FIG. 11A is a side view of a chain wrapped around a pivot control sprocket.
Figure 11B:
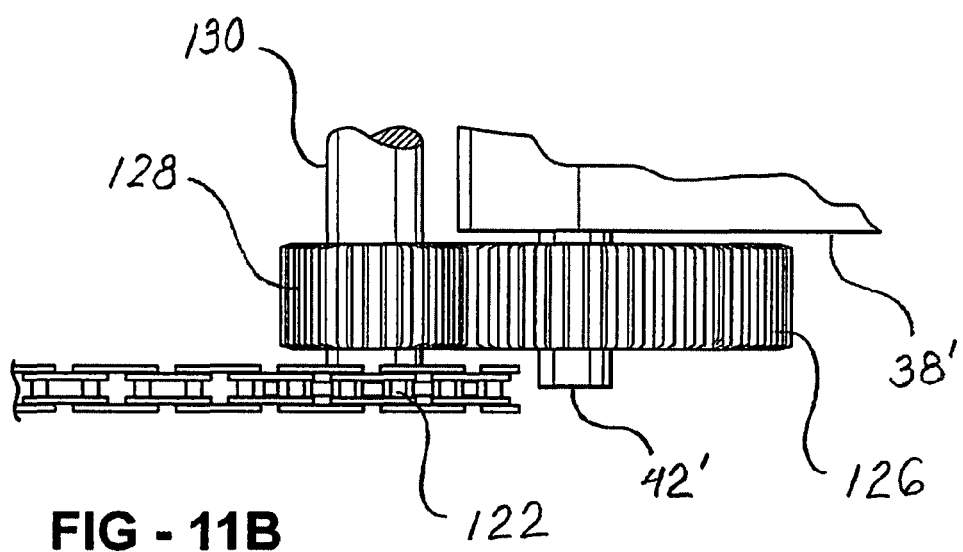
FIG. 11B is a top view of the chain at a first end of the arm.
Figure 12:
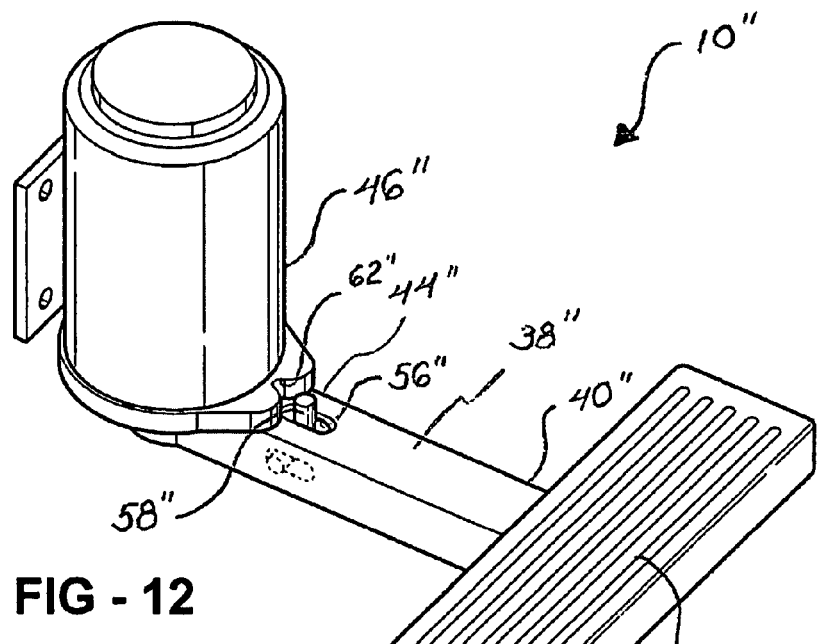
FIG. 12 is a perspective view of a step assembly according to a third embodiment of the invention.
Figure 13:
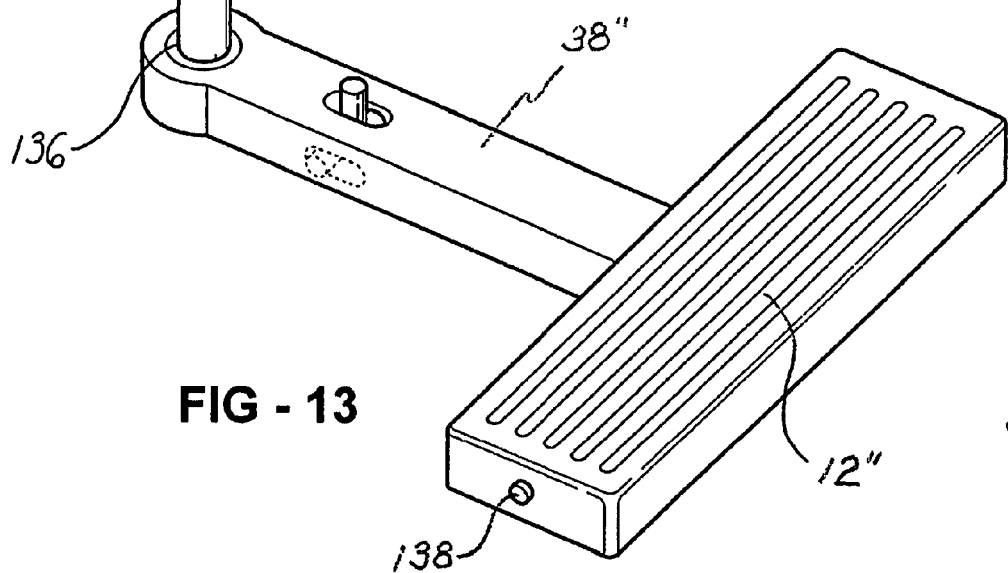
FIG. 13 is a perspective view of a shaft, arm, and step of the step assembly.
Figure 16:
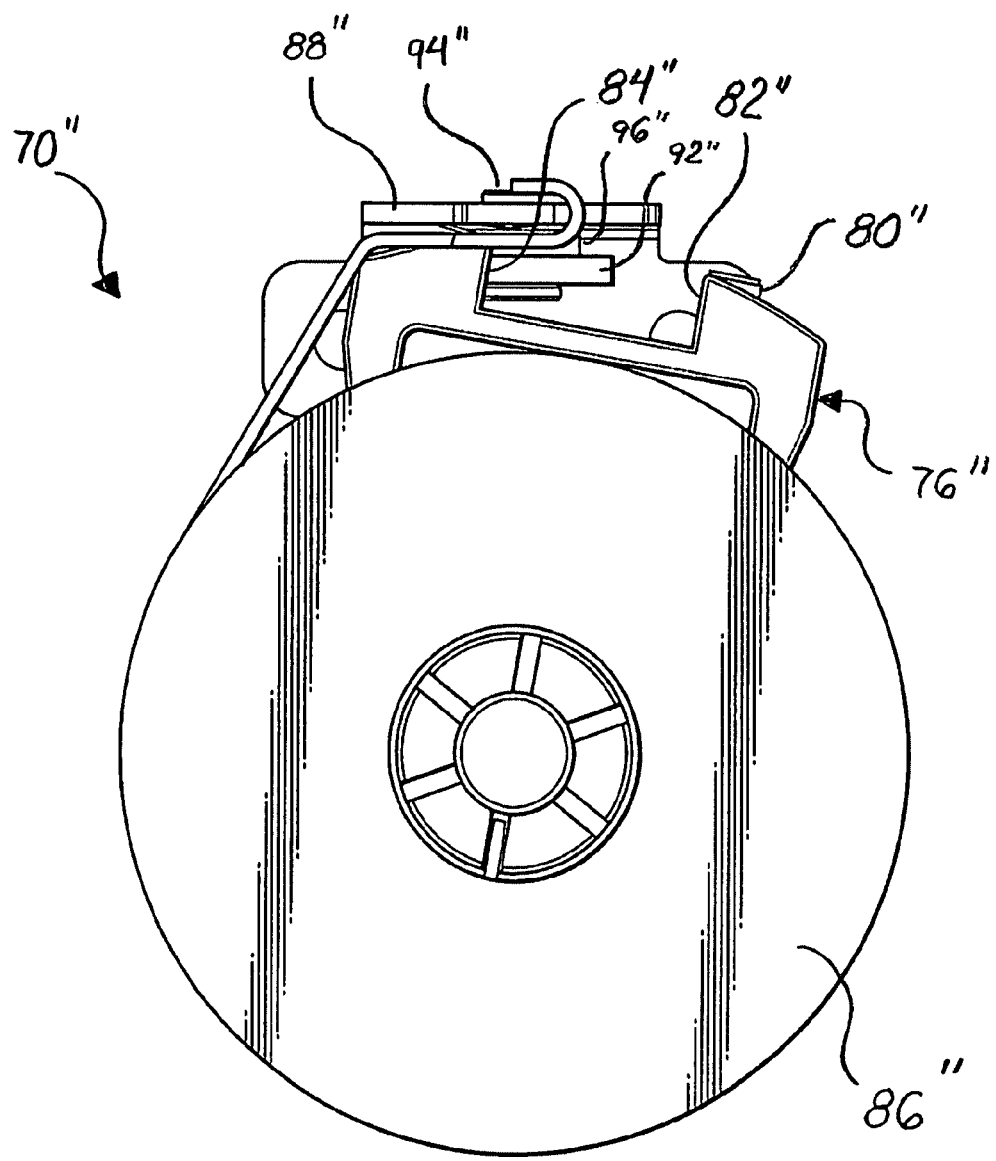
FIG. 16 is a side view of a latch hub including a deploy spring.
Figure 17:
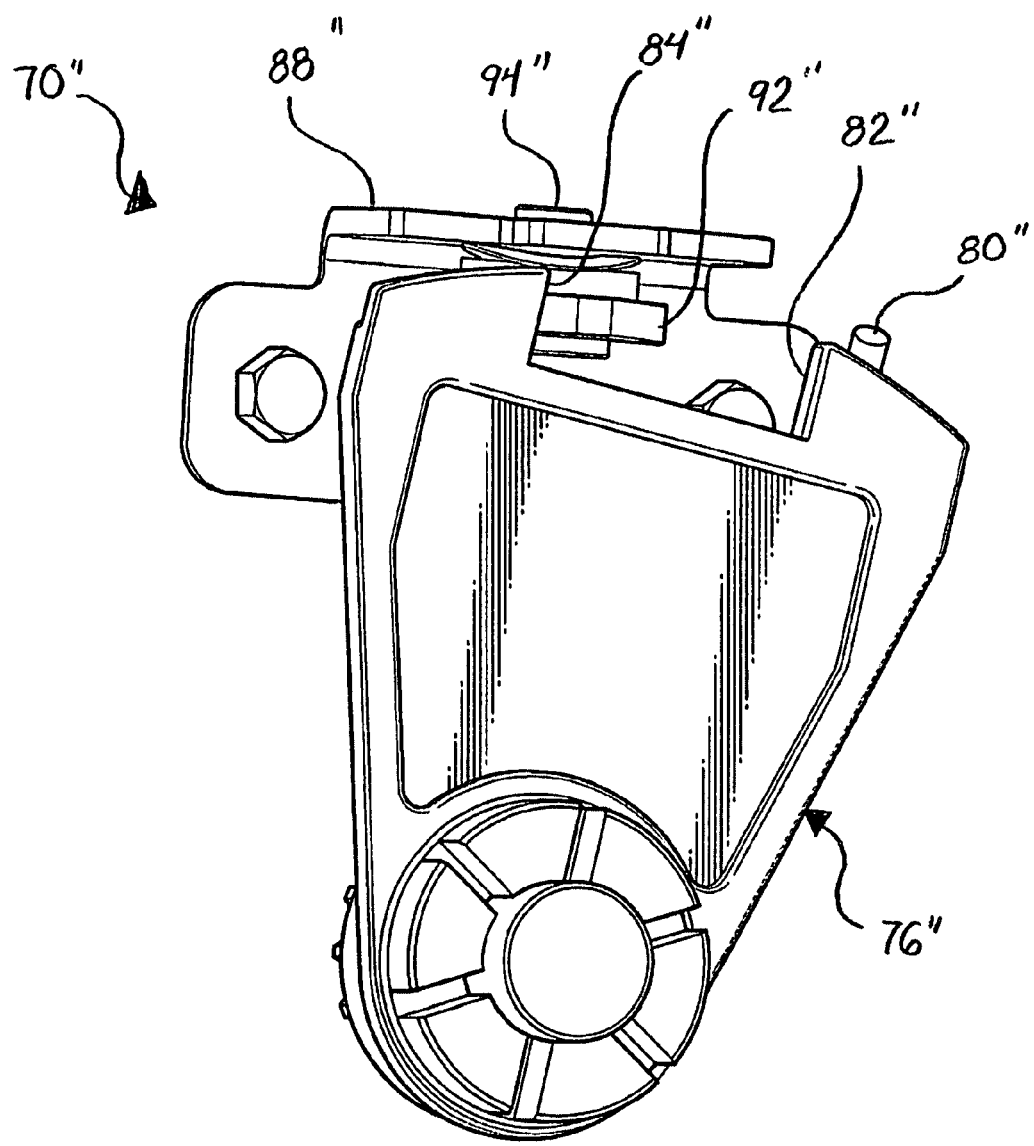
FIG. 17 is a perspective view of the latch hub and a pawl mount.

In an alternative embodiment, a chain 122 may be utilized in place of the cable 114 and sector 116, as shown in FIG. 11A, for controlling the rotation of the step 12' relative to the arms 32'. The chain 122 wraps around a pivot control sprocket 124. A pivot control gear 126 is fixedly secured to the pivot pin 42'. The pivot control gear 126 is in meshing engagement with a pivot control pinion 128. The pivot control pinion 128 is fixedly mounted along a pinion shaft 130.

Referring to FIGS. 12 through 17, wherein like double-primed reference numerals represent similar elements as those set forth above, the step assembly 10" according to a third embodiment of the invention includes a rotatable shaft 132 having an upper end 134 and an opposing lower end 136. The lower end 136 of the shaft 132 is fixedly secured to the second end 44" of the arm 38". As a result, rotation of the shaft 132 in one direction will move the step 12" from the stowed position to the deployed position and rotation of the shaft 132 in an opposite direction will move the step 12" from the deployed position to the stowed position.

Referring to FIGS. 14 and 15, a release button 138, which extends out from an interior portion of the step 12", is provided to initiate movement of the step 12" from the deployed position to the stowed position. The release button 138 is coupled to one end 140 of an actuator rod 142. An opposing end 144 of the actuator rod 142 is fixedly secured to a first segment 146 of a bell crank lever, generally indicated at 148, housed within the step 12". The bell crank lever 148 pivots about a pivot pin 150.

One end 152 of an actuator release rod 154 is fixedly secured to a second segment 156 of the bell crank lever 148. An opposing end 158 of the actuator release rod 154 is coupled to the deploy lock pin 58" disposed within the upper slot 56" at the second end 44" of the arm 38".

The step assembly 10" also includes the latch assembly 70" as set forth in the first embodiment. More specifically, the latch assembly 70" retains the step 12" in the stowed position. The deploy spring 86" biases the step 12" into the deployed position when the latch assembly 70" releases the step 12" from the stowed position.

In operation, to move the step 12" from the stowed position to the deployed position, an individual provides an initial foot action to the step 12" in order to disengage the latch hub 76" from the pawl 92", upon which the deploy spring 86" biases the step 12" towards the deployed position. The rotatable shaft 132 rotates and, with it the arm 38", in order to rotate the step 12" about a vertical axis. The deploy lock pin 58" travels through the upper slot 56" until it is received within the notch 62". At this time, the step 12" is in the deployed position.

To move the step 12" from the deployed position to the stowed position, the release button 138 is pushed by a foot action, which causes the bell crank lever 148 to pivot about the pivot pin 150 in the direction of arrow A (see FIG. 14). As a result, the actuator release rod 154 is pulled in the direction of arrow B, also shown in FIG. 14, and the deploy lock pin 58" is pulled out of the notch 62". The step 12" is now free to move into the stowed position. Continued foot action causes engagement between the latch hub 70" and the pawl 84", the step assembly 12", the latch assembly 64" locks the step 12" in the stowed position.

Figure 18:
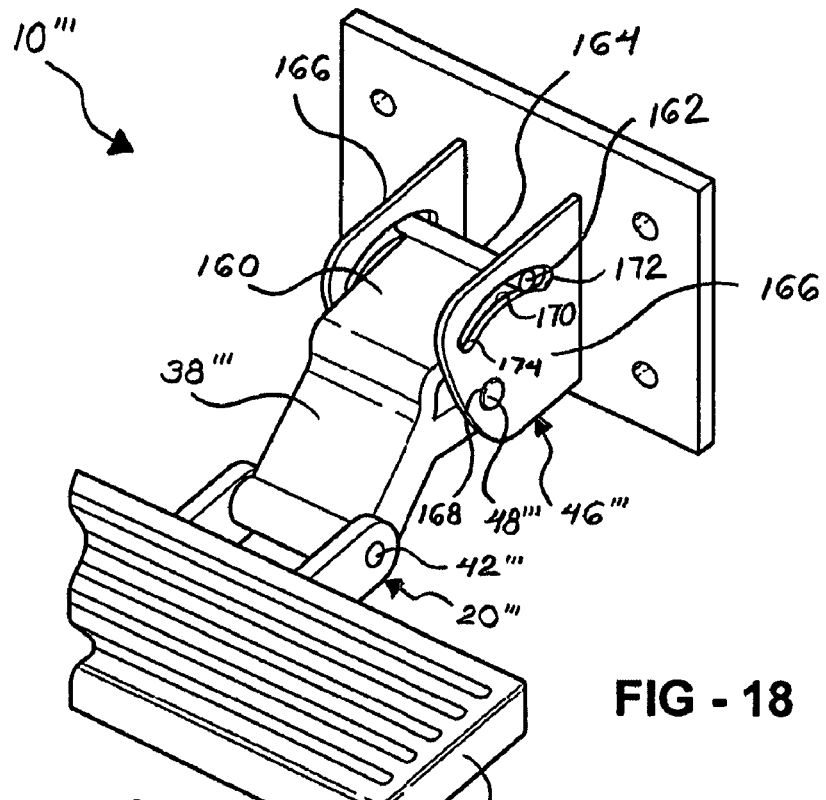
FIG. 18 is a fragmentary, perspective view of the step assembly according to a fourth embodiment of the invention including an arm having an extension member received within a guide slot.
Figure 19:
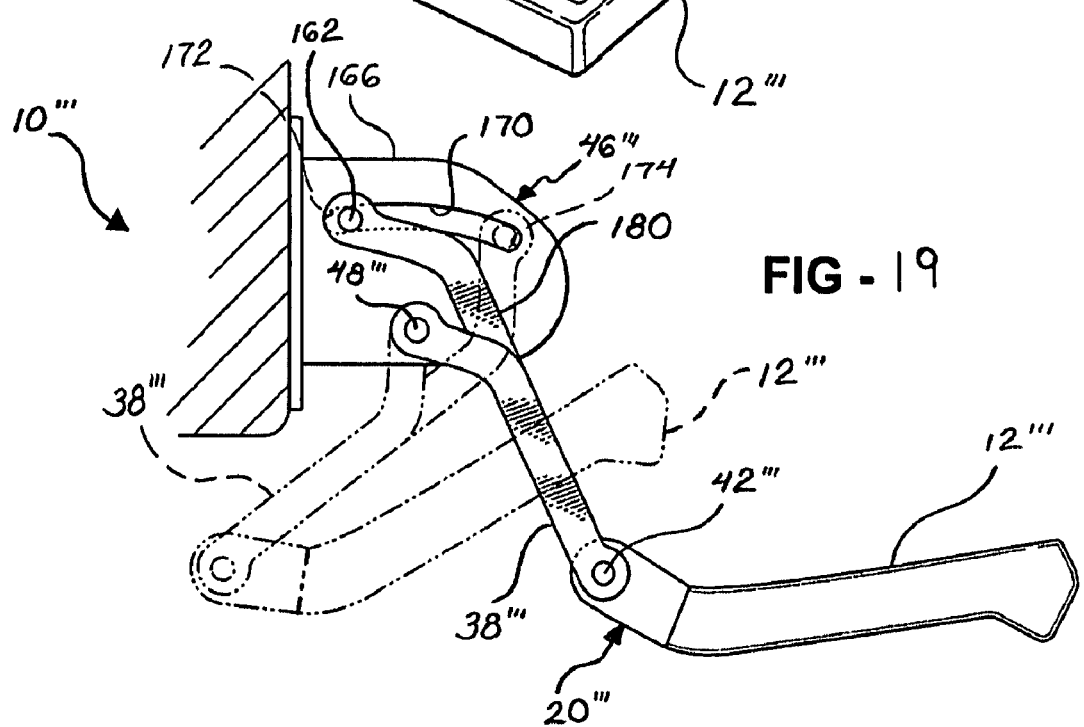
FIG. 19 is a side view of a step assembly including the step in the deployed and stowed positions.
Figure 20:
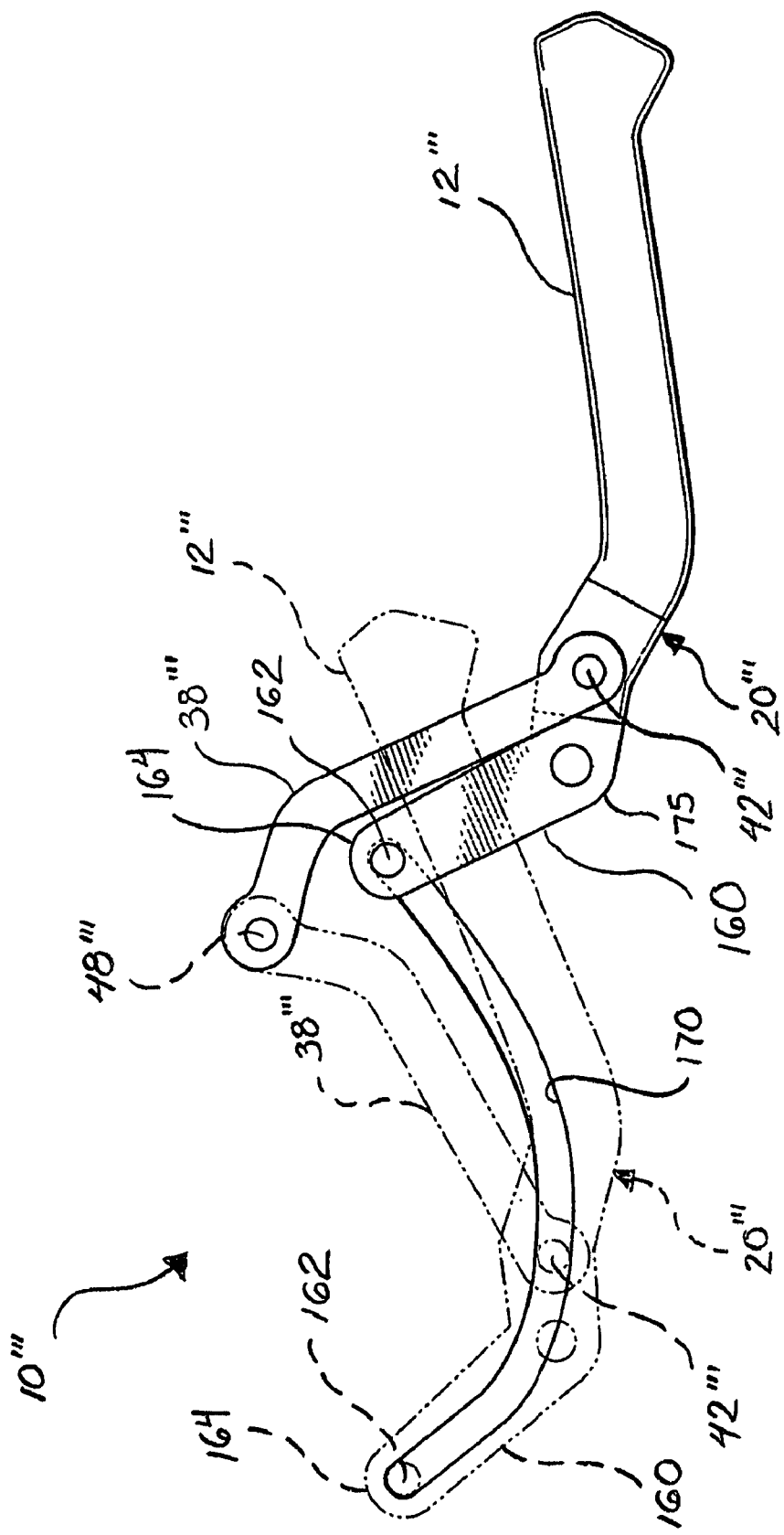
FIG. 20 is a side view of a step assembly including an extension member secured to a link and received within a guide slot.

Referring to FIGS. 18 through 20, wherein like triple-primed reference numerals represent similar elements as those set forth above, in a fourth embodiment of the invention the arm 38''' of the step assembly 10''' includes an extension member 160. The extension member 160 may extend out from a middle portion of the arm 38''' between the first 40''' and 44''' ends thereof, as shown in FIGS. 18 and 19, or directly from the link 18''', as shown in FIG. 20. The extension member 160 includes a guide pin 162 at a distal end 164.

Referring to FIGS. 18 and 19, the upper housing 40''' of the step assembly 10''' includes a pair of spaced apart plates 166 receiving the arm 38''' and extension member 160 therebetween. Each of the spaced apart plates 166 includes an aperture 168 for receiving the pivot pin 48''' at the second end 44''' of the arm 38''' to allow for pivotal movement of the arm 38''' relative to the upper housing 46'''. Each of the spaced apart plates 166 also includes a guide slot 170 extending between a deploy end 172 and a stow end 174. The guide slot 170 preferably has an arcuate shape. The guide pin 162 is received within the guide slots 170 to couple the extension member 160 to the upper housing 46'''.

In operation, when the step 12''' is in the stowed position A, shown in FIG. 18, the guide pin 162 is located at the stow end 174 of the guide slot 170. An initial foot action in the downward direction will cause the arm 38''' to pivot about the pivot pin 42''' and the pivot pin 48'''. In response to such pivotal movement, the guide pin 162 begins to move from the stow end 174 of the guide slot 170 to the deploy end 172 thereof. When the guide pin 162 reaches the deploy end 172 of the guide slot 170, the step 12''' has reached the deployed position B, also shown in FIG. 18, and there is no further pivotal movement of the step 12'''. The step 12''' is now available for to support a user thereon.

In order to move the step 12''' from the deployed position back to the stowed position, an initial foot action in the upward direction is applied to the step 12'''. As a result, the arm 38''' pivots about the pivot pin 42''' and the pivot pin 48'''. In response to such pivotal movement, the guide pin 162 begins to move from the deploy end 172 of the guide slot 170 to the stow end 174 thereof. When the guide pin 162 reaches the stow end 174 of the guide slot 170, the step 12''' has reached the stowed position A. In each of the stowed and deployed positions, the guide pin 162 is maintained in place by gravity such that only a certain amount of force is required to move the step 12''' out of either the stowed or deployed positions.

Referring to FIG. 20, the extension member 160 is fixedly secured to an inboard end 175 of the link 18'''. The guide pin 162 at the distal end 164 of the extension member 160 is received within the guide slot 170. The guide pin 162 moves between the deploy 172 and stow 172 ends of the guide slot 170 as the arm 38''' moves the step 12''' between the deployed and stowed positions. The step assembly 12''' as shown in FIG. 20 provides good packaging options when in the stowed position and may be either manually operated or automated.

In each of the four above-described embodiments of the step assembly 10, 10', 10", 10''', a three-bar linkage, i.e., the link 18, the arm 38, and the upper housing 46, is utilized to move the step 12 between the stowed and deployed positions. The three-bar linkage takes up less space along the body panel of the motor vehicle than a traditional four-bar linkage. As a result, the step assembly 10, 10', 10", 10''' may be mounted to a wide variety of motor vehicles.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A step assembly for a motor vehicle, said step assembly comprising:
    an upper housing adapted to be fixedly secured to the motor vehicle, said upper housing including a notch formed therealong;
    a step movable relative to said upper housing between a stowed position and a deployed position;
    a single arm pivotal with respect to said upper housing and pivotal with respect to said step for moving said step between said stowed and deployed positions, said arm including a deploy lock pin selectively received within said notch to maintain said step in said deployed position;
    a link having one end fixedly secured to said step and an opposing end pivotally coupled to said arm, said link including at least one locking surface formed therealong, said locking surface directly engageable with said arm providing a stop for said step in said deployed position; and
    a cable having a first end coupled to said deploy lock pin and a second end coupled to said link wherein actuation of said second end pulls said deploy lock pin out of said notch and allows said step to move from said deployed position to said stowed position.

2. A step assembly as set forth in claim 1 including a pivot pin fixedly supporting said arm therealong.

3. A step assembly as set forth in claim 2 including a latch assembly operably coupled to said arm and selectively preventing movement of said arm with respect to said upper housing and said step.

4. A step assembly as set forth in claim 3 wherein said latch assembly includes a latch hub fixedly mounted along said pivot pin and pivotally movable in response to pivotal movement of said arm.

5. A step assembly as set forth in claim 4 wherein said latch assembly includes a pawl selectively locking said latch hub to retain said step in said stowed position.

6. A step assembly as set forth in claim 1 wherein said arm includes an upper slot, said deploy lock pin is disposed within said upper slot.

7. A step assembly as set forth in claim 6 wherein said deploy lock pin is biased toward said upper housing.

8. A step assembly as set forth in claim 7 including a deploy spring connected to said deploy lock pin, said deploy spring biasing said deploy lock pin toward said upper housing.

9. A step assembly as set forth in claim 1 wherein said link includes a slot formed therealong, said arm including a tilt lock pin selectively received within said slot to prevent said step from tilting out of said stowed position.

10. A step assembly as set forth in claim 9 wherein said arm includes a lower slot, said tilt lock pin is disposed within said lower slot.

11. A step assembly as set forth in claim 10 wherein said tilt lock pin is biased toward said link.

12. A step assembly as set forth in claim 11 including a tilt lock spring connected to said tilt lock pin, said tilt lock spring biasing said tilt lock pin toward said link.

13. A step assembly for a motor vehicle, said step assembly comprising:

an upper housing adapted to be fixedly secured to the motor vehicle, said upper housing including a notch formed therealong;

a step movable relative to said upper housing between a stowed position and a deployed position;

a single arm pivotal with respect to said upper housing for moving said step between said stowed and deployed positions, said arm including a deploy lock pin selectively received within said notch to maintain said step in said deployed position;

a link having one end fixedly secured to said step and an opposing end pivotally coupled to said arm; and a cable having a first end coupled to said deploy lock pin and a second end coupled to said link wherein actuation of said second end pulls said deploy lock pin out of said notch and allows said step to move from said deployed position to said stowed position.

14. A step assembly as set forth in claim 13 wherein said arm includes an upper slot, said deploy lock pin is disposed within said upper slot.

15. A step assembly as set forth in claim 14 wherein said deploy lock pin is biased toward said upper housing.

16. A step assembly as set forth in claim 15 including a deploy spring connected to said deploy lock pin, said deploy spring biasing said deploy lock pin toward said upper housing.

17. A step assembly as set forth in claim 13 wherein said link includes a slot formed therealong, said arm including a tilt lock pin selectively received within said slot to prevent said step from tilting out of said stowed position.

18. A step assembly as set forth in claim 17 wherein said arm includes a lower slot, said tilt lock pin is disposed within said lower slot.

19. A step assembly as set forth in claim 18 wherein said tilt lock pin is biased toward said link.

20. A step assembly as set forth in claim 19 including a tilt lock spring connected to said tilt lock pin, said tilt lock spring biasing said tilt lock pin toward said link.

\* \* \* \* \*